(No Model.)
G. K. DAVIS.
LADDER AND CHUTE FOR FRUIT GATHERING.
No. 592,133. Patented Oct. 19, 1897.
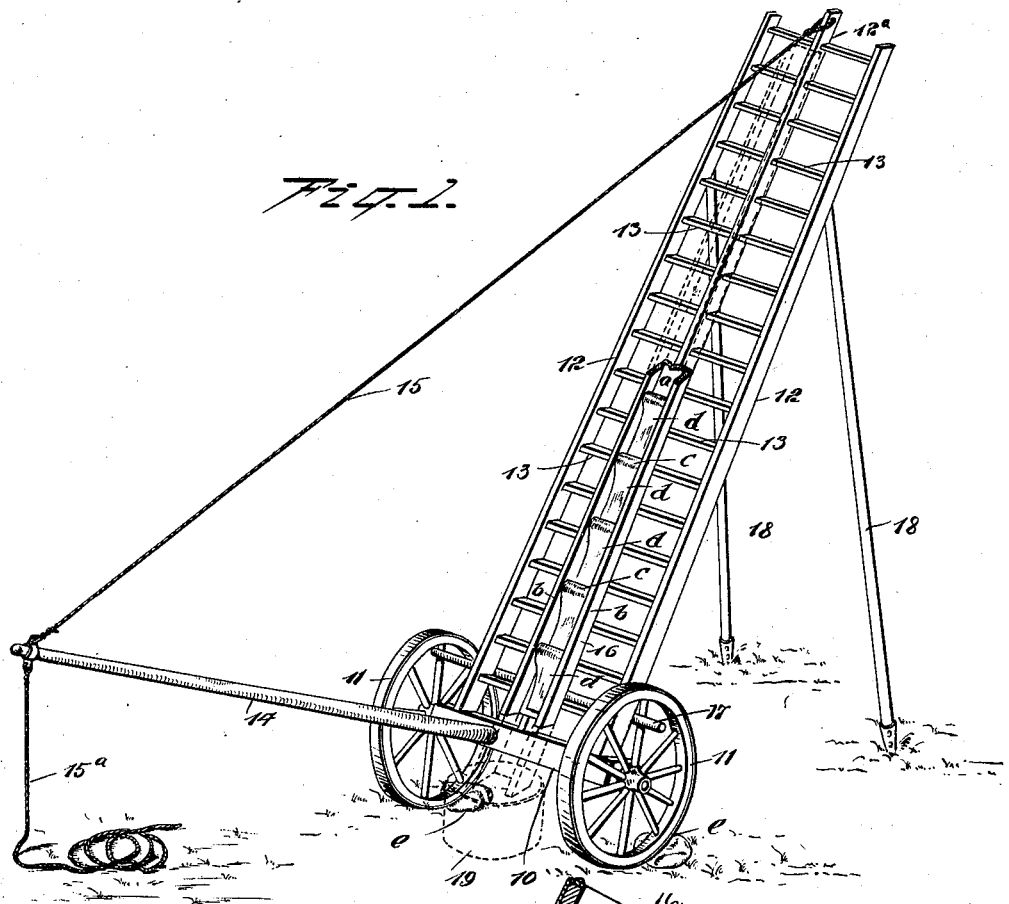
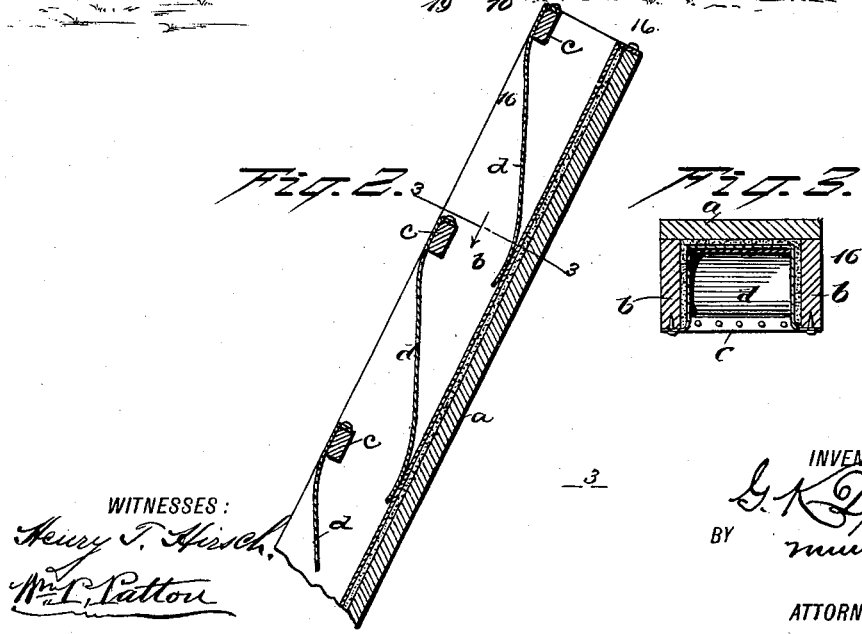
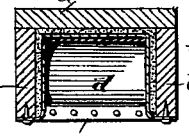
WITNESSES:
Henry T. Hirsch
Wm. L. Patton
INVENTOR
G. K. Davis
BY
ATTORNEYS.

UNITED STATES PATENT OFFICE.

GEORGE K. DAVIS, OF LEWISTON, MAINE.

LADDER AND CHUTE FOR FRUIT-GATHERING.

SPECIFICATION forming part of Letters Patent No. 592,133, dated October 19, 1897.

Application filed October 6, 1896. Serial No. 608,009. (No model.)

*To all whom it may concern:*

Be it known that I, GEORGE K. DAVIS, of Lewiston, in the county of Androscoggin and State of Maine, have invented a new and Improved Ladder and Chute for Fruit-Gathering, of which the following is a full, clear, and exact description.

This invention relates to improved means for reaching fruit on trees and conveying the plucked fruit safely to the ground.

The invention consists in such peculiar features of construction as are defined in the claims.

Reference is to be had to the accompanying drawings, forming a part of this specification, in which similar characters of reference indicate corresponding parts in all the figures.

Figure 1 is a perspective view of the improved ladder and chute erected for service. Fig. 2 is an enlarged longitudinal sectional view of an end portion of the chute, and Fig. 3 is a transverse sectional view essentially on the line 3 3 in Fig. 2.

In carrying into effect the features of the invention, as shown in the drawings 10 indicates a strong axle that may be constructed of wood or metal, and on the journaled ends of the axle suitable traction-wheels 11 are rotatably mounted and secured.

A light but substantial ladder, composed of two side bars 12 and of a center bar 12ª, spaced apart by series of rungs 13, is stably connected to the axle 10, preferably by an attachment of one end of each side bar upon the axle, as indicated in Fig. 1.

A sufficient length is afforded the ladder for efficient service as a means to readily reach the upper limbs of fruit-trees when placed in position thereat.

A tongue 14 is detachably secured by one end in or upon the axle 10 at or near its center of length, and a flexible connection 15 has one end of the same attached to the upper end of the central ladder-standard 12ª. The remaining extremity of the flexible connection 15, which may be a rope or chain, is affixed to the outer end of the tongue 14, and, when all parts of the device are assembled for use, the said rope is stretched taut, as shown in Fig. 1. Another flexible connection 15ª is attached by one end to the tongue and is allowed to hang pendent therefrom, and said pendent rope or the like becomes available for elevation of the ladder when it is in a prostrate position, as will be further mentioned.

On the ladder, preferably over the center standard or bar 12ª, the improved fruit conveyer or chute 16 is secured, so as to extend longitudinally of the ladder, as represented by full and dotted lines in Fig. 1.

The chute 16 consists, essentially, of a bottom piece *a*, having sufficient length to suit the desired dimensions of the conveyer, and on said piece of flat material two sides *b* are affixed by an edge of each side piece, thereby producing a trough of sufficient capacity to receive and permit the free traverse therein of such fruit as apples, pears, or peaches.

The inner surface of the bottom piece *a* is preferably padded, as shown in Figs. 2 and 3, and the side walls *b* may also be cushioned in like manner to protect the fruit from being bruised while rolling or sliding down in the chute.

At suitable intervals cross-bars *c* are secured upon the free edges of the sides *b*, from which are extended the flexible aprons *d*, that hang by an end of each apron within the chute, each having sufficient length to project its lower end below the cross-bar next below the one from which it hangs. These aprons lying with their lower ends resting loosely on the bottom of the trough 16 serve to retard the progress of the fruit in rolling down the chute and thus prevent the fruit from acquiring such a velocity as will injure the fruit. The aprons also serve to prevent the fruit from falling out of the front of the chute.

To adapt the improvements for service, the portable ladder and attached chute are wheeled toward a fruit-tree by pushing or drawing upon the tongue 14, and the upwardly-projecting ladder is inclined toward the tree from which fruit is to be removed. To maintain the ladder in a proper position, the wheels 11 are scotched with stones or blocks, as clearly shown at *e* in Fig. 1, and a locking-bar 17 is introduced between the ladder-standards 12 and adjacent spokes of the wheels.

When the ladder is to be occupied by two or more fruit-pickers near its upper end for removal of fruit from the top branches of a fruit-tree, it is of advantage to provide the ladder with a pair of props 18, which have their upper ends engaged with the inclined ladder-standards 12, and bedded at their lower ends in the soil.

It will be evident that when the improved ladder and fruit-conveying chute are in position for use at a fruit-tree, several persons can occupy rungs 13 of the ladder at different points thereon, and quickly gather all the fruit which can be conveniently reached, and as fast as the fruit is removed it is introduced within the chute 16 through the openings afforded one above each cross-bar $c$.

When the fruit reaches the lower end of the chute 16, it may be allowed to roll upon the sod beneath the tree, but preferably a basket or other receptacle 19 is located in such a relative position with regard to the lower end of the chute that the fruit as it leaves the latter will enter the said receptacle, which may be changed from time to time as it becomes full, or may be emptied and then replaced as may be required.

It will be seen from the foregoing description that the wheeled ladder and attached chute may be readily changed in position, so that fruit on all sides of a tree may be gathered, and that from the relative proportion of the ladder several persons may work on the ladder, and with equal facility deposit the fruit as gathered in the chute to convey it down into a suitable receptacle.

The props 18 and tongue 14 being detachable from the axle and standards of the wheeled ladder, it will be apparent that these parts may be placed upon the ladder when it has been lowered, and the ladder-bars 12 may then be used as handles of a cart to push the device from one point to another, this being particularly of advantage when the improved ladder and chute are to be removed from a place of storage to the orchard for use, or for returning the ladder and attachments to a place of storage when the work of fruit-gathering is completed.

When the ladder and chute are transferred from the storehouse or barn to the orchard, and the ladder is in a prostrate condition, it can be easily elevated for service by first putting the tongue 14 into position on the axle 10, which will obviously cause the tongue to incline upwardly and away from the ladder.

The wheels 11 are now scotched with stones or blocks $e$, and the rope or chain $15^a$ is pulled upon, which will cause the ladder to rock upwardly as the free end of the tongue is pulled down, and when the tongue can be reached its relative length affords leverage enough to enable the operator to readily propel the ladder, while erect, to a desired point.

The central rail of the ladder projects above the side rails of the ladder and forms a member whereon the ladder may be turned to place it in different positions during the work of picking the fruit. When all three of the rails of the ladder rest on a limb of a tree, the ladder would have to be entirely disengaged from the limb before it could be turned, but by projecting one of the rails, so that it forms substantially a pivot whereon the ladder may turn, the ladder may be much more easily adjusted.

Having thus fully described my invention, I claim as new and desire to secure by Letters Patent—

1. A fruit-harvesting apparatus having a trough, a series of cross-bars running transversely across the trough at the open side thereof, and a series of flexible aprons respectively carried by the cross-bars and hanging loosely from the cross-bars, the lower end of each apron projecting below the cross-bar directly beneath the cross-bar on which the said apron is supported and the said lower ends of the aprons being respectively located inward from the cross-bars adjacent thereto, substantially as described.

2. A fruit-gatherer having a mounted axle, a boom or tongue fixed to the axle, a ladder also fixed to the axle and projecting at an angle to the boom or tongue, the ladder being formed of three parallel rails with rungs running between them, a fruit-conductor running along the intermediate rail and carried thereby, a stay rigged between the outer end of the boom or tongue and the outer end of the intermediate rail of the ladder, and two props respectively pivoted to the side rails of the ladder and serving to hold the ladder in an upright position, substantially as described.

GEORGE K. DAVIS.

Witnesses:
FRED P. STEVENS,
RALPH W. BARTLETT.